May 15, 1923.  1,455,194

J. EATON

MOTOR CONTROL

Filed March 15, 1921

Inventor:
John Eaton,
by
His Attorney

Patented May 15, 1923.

1,455,194

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR CONTROL.

Application filed March 15, 1921. Serial No. 452,520.

*To all whom it may concern:*

Be it known that I, JOHN EATON, a subject of the King of Great Britain, residing at Schenectady, in the county of Schenectady, State of New York, have invented certain new and useful Improvements in Motor Controls, of which the following is a specification.

My invention relates to the control of electric motors and it provides improved means for starting, stopping and generally controlling the same.

My invention has a particular application to the control of electric motors which are required to operate between predetermined limits. An application of this nature is found in the control of an electric motor which operates the feed of a planer, or the like. The feed motor of a planer is required to operate a portion of a revolution or a predetermined number of revolutions and then automatically stop and continue this operation during the operation of the planer. It is also required that the feed of the planer be adjustable at will; that is, that the limits between which the feed motor operates shall be freely adjustable.

One of the objects of my invention is to provide improved means whereby the motor is operated in the manner specified.

The invention has a particular application to the control of the feed motor of a planer or the like, but it is not necessarily limited thereto.

In carrying the invention into effect, I provide a control for the motor involving the use of a controller, one element of which is movable in accordance with the movement of the motor to stop the motor at its limit of travel, and another element which can be adjusted with reference to the first element so as to vary the limits of operation of the motor. When the motor has operated the first element to the limit determined by the second element, the motor is deenergized. An electromagnetic coupling between the first element and the motor is provided which normally connects the element with the motor, and the element is biased to a predetermined position so that the element is released from the motor and returned to its biased position in response to the operation of the electromagnetic coupling.

Figure 1:
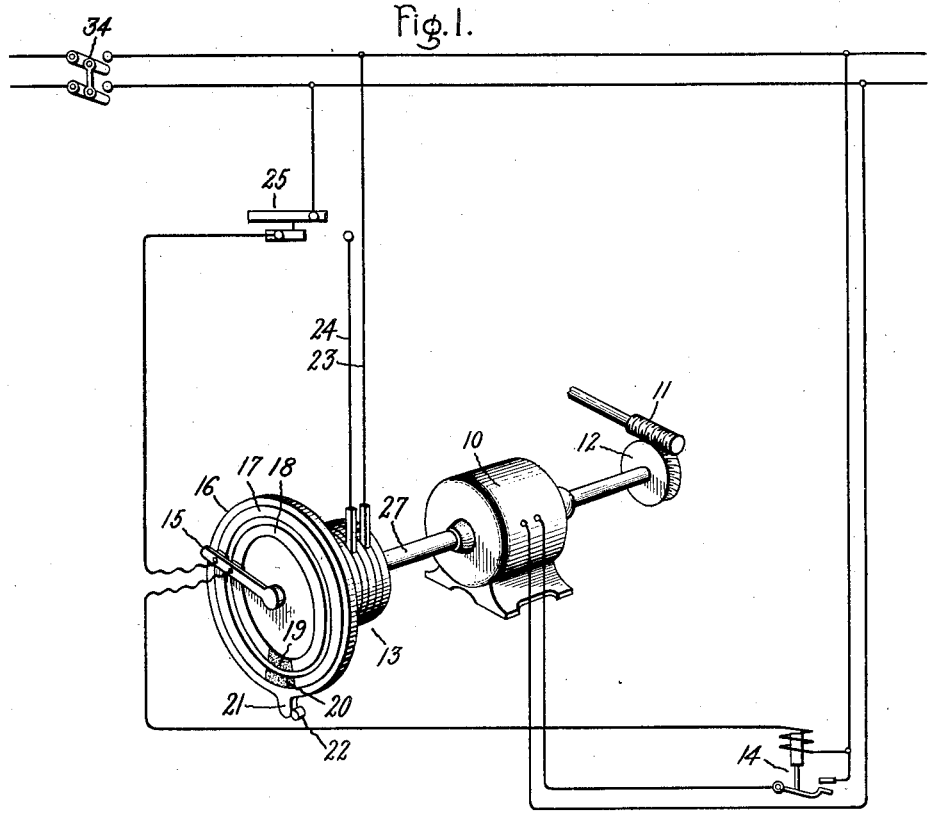
Figure 2:
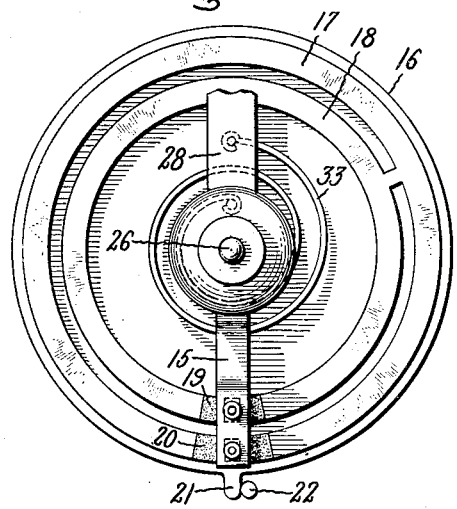

For a better understanding of the invention, reference is had to the accompanying drawing which shows an embodiment of the invention for purposes of illustration, and in which Fig. 1 is a simplified diagram of a motor control; Fig. 2 is a front view of a controller for the motor; and Fig. 3 is a cross section of the same.

Referring to the drawings, the electric motor 10 is adapted to drive the feed screw 11 of a planer or the like through the worm gear 12. This motor is controlled by means of my improved controller in such a way that it is started and automatically stopped after the motor has made a predetermined movement, that is, a predetermined number of revolutions or a portion of a revolution, by means of the controller 13, which is illustrated in more detail in Figs. 2 and 3. A line contactor 14 for controlling the energization of the motor 10 is provided, and this line contactor is controlled by means of the controller 13 to effect the desired operation. In general, this controller 13 comprises two relatively movable elements, one of which is the adjustable contact member 15, which is mounted with respect to the rotatable disc 16 so as to have the same axis of rotation. This disc has conducting segments 17 and 18 on its surface which cooperate with the corresponding contacts on the adjustable contact member 15. The concentric conducting strips 17 and 18 on the face of the disc 16 are interrupted by the insertion of insulating segments 19 and 20, and the disc is biased to the position shown in the drawing at which the insulating segments are at the position shown in the drawings. A projection 21 on the disc 16 cooperates with a stop 22 to limit the counter-clockwise rotation of the disc. The disc is rotated clockwise by means of the motor 10 until the insulating segments 19 and 20 are brought under the adjustable contact member 15, whereupon the line contactor 14 is deenergized and the motor stopped. An electromagnetic clutch controlled through the conductors 23 and 24 is provided for releasing the connection between the motor and the disc 16 so as to permit the disc to return to its biased position preparatory to again starting the motor and causing it to rotate through the desired angular distance and then be automatically stopped. A master controller 25 is provided for controlling the electromagnetic clutch of the controller and the line contactor 14 for the motor. The arrangement is such that the motor always operates in the same direction, but my invention is not necessarily limited to an arrangement of this sort.

Figure 3:
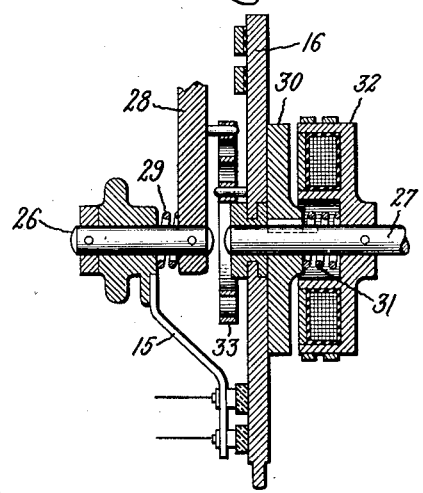

Referring now to Figs. 2 and 3 which show in more detail the particular construction of the controller 13, the adjustable contact member 15 is rotatably mounted on a shaft 26 which has the same axis of rotation as the shaft 27 for the disc 16. The shaft 26 is secured in its proper position by means of a stationary support 28, and the contact member 15 is frictionally held in the position to which it is moved by means of the spring 29. An electromagnetic coupling is provided between the motor shaft 27 and the disc 16. This coupling comprises the friction disc 30, normally held in frictional engagement with one surface of the disc 16 by means of the spring 31. An electromagnet 32, controlled through the conductors 23 and 24 (Fig. 1), is provided for attracting the friction disc 30 and thereby permit the disc 16 to return to its biased position. It will be understood that the clockwise rotation of the disc 16 will wind up the spring 33 so that when the friction disc 30 is released by reason of the attraction of the electromagnet 32, the disc 16 will return to the position shown in the drawings by reason of the stored-up energy in the spring 33.

The disc 16 is shown as being rotatably mounted on the motor shaft 27 and connected in such a manner as to be moved in exact accordance with the movement of the motor. It will be understood, however, by those skilled in the art from an understanding of the invention that the disc 16 need not be mounted on the motor shaft so as to be moved in exact accordance with the movement of the motor, but need be merely operated synchronously with the rotation of the motor. It will also be understood that in case it is desired that the motor 10 make a predetermined number of revolutions instead of a portion of a revolution as shown in the arrangement of the drawings, a speed reduction connection between the motor and the disc 16 will be necessary.

As thus constructed and arranged, the operation of my invention is as follows:—In order to start the electric motor, the disconnecting switch 34 will be closed and the winding of the line contactor 14 for the motor will thereby be energized through a circuit including the contacts of the master switch 25, the adjustable contact member 15 and the conducting segments 17 and 18 of the disc 16. The motor will thereby be energized to operate and rotate the disc 16 in a clockwise direction until the insulating segments 19 and 20 have been brought underneath the contacts of the adjustable contact member 15. The line contactor 14 will thereby be deenergized and the motor will be disconnected from the source of supply. The rotation of the disc 16 will wind up the spring 33 and put this spring under strain tending to bias the disc to the original position, that shown in Fig. 1. In order to release the disc to permit the same to return to the original position, the master controller 25 is thrown to its right-hand position at which the winding of the electromagnetic clutch or coupling 32 is energized. This will cause the friction disc 30 to be attracted and thereby release the disc 16 to rotate freely to the original position by reason of the unwinding of the spring 33. The parts are now in the original position so that when the master switch 25 is thrown to its left-hand position, that shown in the drawings, the line contactor 14 will again be energized and the motor again moved through the angular distance determined by the adjustment of the contact member 15. In case it is desired that the angular movement of the motor be varied the contact member 15 will be rotated to the desired position, thereby varying the movement of the disc 16 which is necessary in order to bring the insulating segments 19 and 20 under the contact member 15. It will be understood by those skilled in the art that the master switch 25 may be automatically operated responsively to the movement of a part of the machine so as to be automatically started and stopped at the desired intervals. As applied to a planer, the motor 10 will operate the feed mechanism through the worm gearing shown, and the master controller 25 will be operated by some reciprocating part connected to the bed of the planer so that when the bed has reached one limit of operation, the feed motor will be operated for the desired interval and then automatically stopped. The master switch must then be operated in the other position to return the controller 13 to its original position.

In accordance with the provisions of the Patent Statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. A controller for electric motors comprising two relatively movable contact members, the first of which is adjustable with reference to the second and the second of which is biased to one position and is normally connected to the motor to be moved thereby against its bias to a position at which the circuit through the members is interrupted, a normally deenergized electromagnetically controlled coupling connecting the motor and the second member which when energized releases the said member and permits the same to return to its biased position, and connections controlled by the said members for controlling the energization of the said motor.

2. A controller for electric motors comprising two relatively rotatable contact members, the first of which is adjustable with reference to the second, means for biasing the second member to a position at which a circuit for controlling the motor is completed through the members, a normally operative connection between the motor and the second member for causing the member to be rotated in accordance with the rotation of the motor to a position, determined by the position of the first member at which the said circuit through the members is opened, and electromagnetically controlled means for releasing the said connection to permit the second member to return to its biased position.

3. A controller for electric motors comprising a rotatable contact disc, an adjustable contact element cooperating therewith to control the motor, means for biasing the said disc to one position, an electromagnetic coupling comprising a member adapted to normally frictionally engage the contact disc and rotate the disc in accordance with the rotation of the motor, connections whereby the motor is deenergized when the said disc has been moved to a position determined by the setting of the said contact element and means for causing said electromagnetic coupling to be energized to release the said disc to permit the disc to return to its biased position.

4. The combination with the feed motor of a planer or the like, of a controller for said motor comprising two cooperating rotatable contact members, the first of which is mounted for adjustment with reference to the second so as to predetermine the limit of operation of said motor and the second of which is biased to a predetermined position with respect to the first, an electromagnetically controlled coupling which normally connects the said motor and the second of said members so as to cause the same to rotate against its bias with the motor, a master switch for controlling the said coupling and for controlling the said motor through the said members of the controller, and connections whereby when the second of said members is rotated by the motor to the position determined by the adjustment of the first of said members, the said motor is stopped, and a subsequent operation of the said master switch causes the said electromagnetically controlled coupling to be energized to release the second of said members to return to its biased position.

In witness whereof, I have hereunto set my hand this 14th day of March, 1921.

JOHN EATON.